K. C. RANDALL.
TRANSFORMER SYSTEM.
APPLICATION FILED JULY 6, 1908.
917,794.
Patented Apr. 13, 1909.
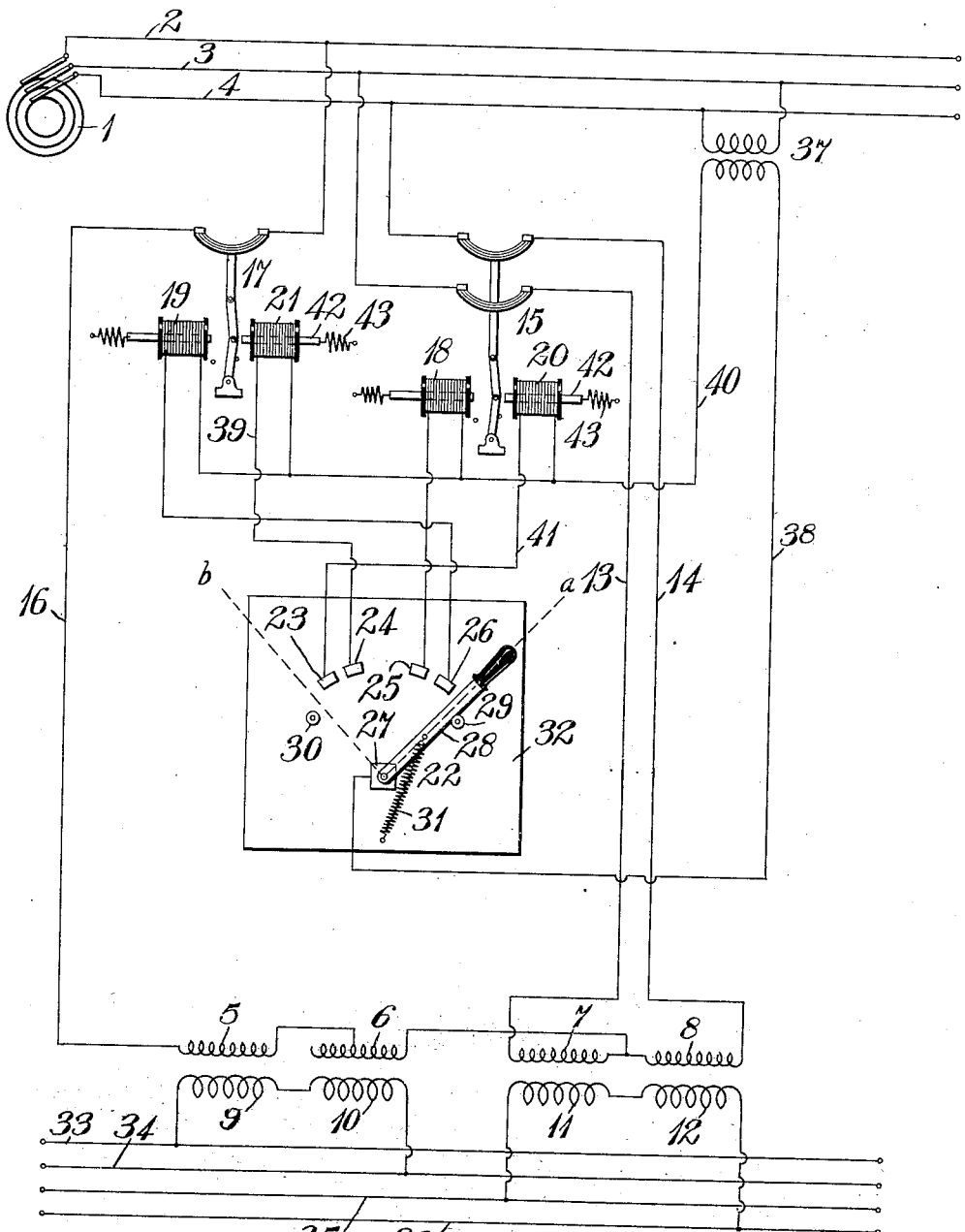
WITNESSES:
Fred H. Miller
R. J. Dearborn
INVENTOR
Karl C. Randall
BY
Wesley G. Carr
ATTORNEY

UNITED STATES PATENT OFFICE.

KARL C. RANDALL, OF EDGEWOOD PARK, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

TRANSFORMER SYSTEM.

No. 917,794.     Specification of Letters Patent.     Patented April 13, 1909.

Application filed July 6, 1908. Serial No. 442,171.

*To all whom it may concern:*

Be it known that I, KARL C. RANDALL, a citizen of the United States, and a resident of Edgewood Park, in the county of Allegheny and State of Pennsylvania, have invented a new and useful Improvement in Transformer Systems, of which the following is a specification.

My invention relates to systems of electrical distribution and it has special reference to high-voltage systems which embody transformers that are adapted to receive current from a three-phase source and to deliver two-phase current to a distributing circuit.

The object of my invention is to provide, in a system of the class above indicated, means for automatically determining the order in which the primary terminals of the transformer or transformers are connected and disconnected from the supply circuit conductors leading from the source of energy.

When a group of transformers are so connected, in accordance with a well known system, as to effect transformation from three-phase to two-phase, and one leg of the three-phase circuit is interrupted, a considerable rise in voltage usually occurs across the main transformer. If independent loads are applied to each leg of the two-phase circuit and one leg of the three-phase circuit is interrupted, the rise in voltage will be still greater and, if there is a load on the teaser or auxiliary transformer alone, the rise in voltage which takes place across the terminals of the main transformer is excessive.

According to my present invention, I prevent an increase in voltage across the main transformer by providing switching devices in the primary circuits which are so interlocked as to necessitate the opening of the circuit to the teaser or auxiliary transformer first, when opening the transformer supply circuit, and completing this circuit last, when the transformer is connected to the source of supply. A three-phase circuit breaker is not suitable for use in this connection since it is impossible to so adjust the breaker that the three circuits will be interrupted at exactly the same instant and since a difference of a very small fraction of a second in the time of opening and closing the three lines would be sufficient to produce the voltage variations above indicated.

The single figure of the accompanying drawing is a diagrammatic view of a system of electrical distribution arranged in accordance with my invention.

Referring to the diagram, the system illustrated comprises a three-phase generator 1 to which a supply circuit 2—3—4 is connected, and a plurality of transformers having primary windings 5, 6, 7, and 8 and secondary windings 9, 10, 11, and 12. The primary windings 7 and 8 are connected in series with each other across the supply circuit conductors 3 and 4 by conductors 13 and 14 which may be interrupted by an electro-responsive switching device 15. One terminal of the winding 6 is connected to the junction of the transformer windings 7 and 8, one terminal of the winding 5 is connected to an intermediate point in the winding 6 and the opposite terminal of the winding 5 is connected to the circuit conductor 2 by a conductor 16 which may be interrupted by a switching device 17. The windings 7, 8, 11, and 12 constitute what is generally known as the main transformer, while windings 5, 6, 9, and 10 constitute the auxiliary or teaser transformer.

The switches 15 and 17 are respectively provided with closing electro-magnets 18 and 19 and tripping magnets 20 and 21 which are governed by a manually operated switch 22. The switch 22 comprises contact terminals 23, 24, 25, 26, and 27, a switch arm 28 which is pivotally mounted on the contact terminal 27, limiting stops 29 and 30 and a spring 31. The contact terminals are mounted on an insulating base or slab 32 and the spring 31 is so interposed between the slab and switch arm as to normally hold the arm in either of two extreme positions *a* and *b*.

The secondary transformer windings 9 and 10 are connected in series with each other between conductors 33 and 34 of a two-phase outgoing circuit 33—34—35—36, the windings 11 and 12 being similarly connected to the circuit conductors 35 and 36.

The operation of the system is as follows: Assuming that the switch arm 28 occupies the position *a* and is, therefore, in engagement with the stop 29, and that the switches 15 and 17 are closed, as shown in the diagram; if the switch arm 28 is moved toward position *b*, it successively engages the contact members 26 and 25. The magnet windings 19 and 18 are consequently successively and temporarily energized, circuit connections being completed as hereinafter pointed out. The magnets 19 and 18, when thus energized, tend to close the circuit interrupters or switching devices 17 and 15, but, since, according to the prior assumption, the said switches are already closed, no result will be effected. As soon as the switch arm 28 passes its central or intermediate position between the stops 29 and 30, the spring 31 tends to throw it into position $b$ and, in approaching this position, the switch arm is successively brought into engagement with the contact members 24 and 23. When the switch arm is in engagement with contact member 24 a circuit is completed from one terminal of any suitable source of energy, such as a transformer 37, through conductor 38, contact member 27, switch arm 28, contact member 24, conductor 39, magnet winding 21 and negative conductor 40 to the opposite terminal of said source. When the switch arm engages the contact member 23 circuit is completed from the contact member 27 through the said arm, contact member 23, conductor 41, magnet winding 20 and conductor 40 to the transformer, the magnet windings 21 and 20 being thus successively energized. The magnets 20 and 21 are similar to each other and each comprises a movable core member 42 which is adapted to open the circuit interrupter of which it forms a part when its electromagnet is sufficiently energized, the core member being returned to its original position by a spring 43. By this means, the circuit interrupter 17 is opened first when it is desired to disconnect the transformer from the generator circuit, which may be accomplished by throwing the governing switch arm from position $a$ to position $b$. Assuming that the switches 15 and 17 are open and that the control switch arm occupies position $b$, the transformers may be connected to the generator circuit by throwing the switch arm from position $b$ to position $a$, and thereby successively energizing the magnet windings 18 and 19 from the transformer 37 to close the said switches.

It will be observed that the arrangement of contact members is such that the teaser transformer circuit conductor 16 is first interrupted when the transformers are disconnected from the circuit and the teaser circuit is closed last when the transformers are connected to the generator circuit, the voltage fluctuations which would otherwise occur being thus avoided. The circuit interrupters 15 and 17 may, of course, be replaced by any other suitable circuit interrupters which are manually or electrically operated.

In view of modifications in the transformer arrangement and circuit connections which may be effected within the scope of my invention, I desire that only such limitations shall be imposed as are specified in the claims.

I claim as my invention:

1. The combination with a three-phase circuit, a two-phase circuit, and interposed transformers, of means for controlling the connections between the three-phase circuit and the transformers, and other means for determining the order in which the said connections are made and broken.

2. In a system of distribution, the combination with a three-phase circuit, a two-phase circuit and a group of interposed transformers, of electro-responsive switching devices between the three-phase circuit and the transformer, and controlling means for determining the order in which the electrically operated switches are opened and closed.

3. In a group of transformers adapted to transform three-phase alternating current energy into two-phase energy, of electrically operated switches for governing the connections between the transformer and the three-phase circuit, and a manually operated switching device for governing the electrically operated switches and for determining the order in which they are opened and closed.

4. In a system of distribution, the combination with a main transformer, an auxiliary or teaser transformer, and a three-phase supply circuit connected to said transformers, of means for governing the circuit connections between the transformers and the three-phase circuit, whereby the circuit of the teaser transformer is completed first and interrupted last.

In testimony whereof, I have hereunto subscribed my name this 20th day of June, 1908.

K. C. RANDALL.

Witnesses:
CHARLES FORTESCUE,
BIRNEY HINES.